Sept. 26, 1967 D. G. McCOY ET AL 3,344,337
A.C. CONTROLLED D.C. CURRENT AMPLIFIER
Filed Sept. 27, 1965
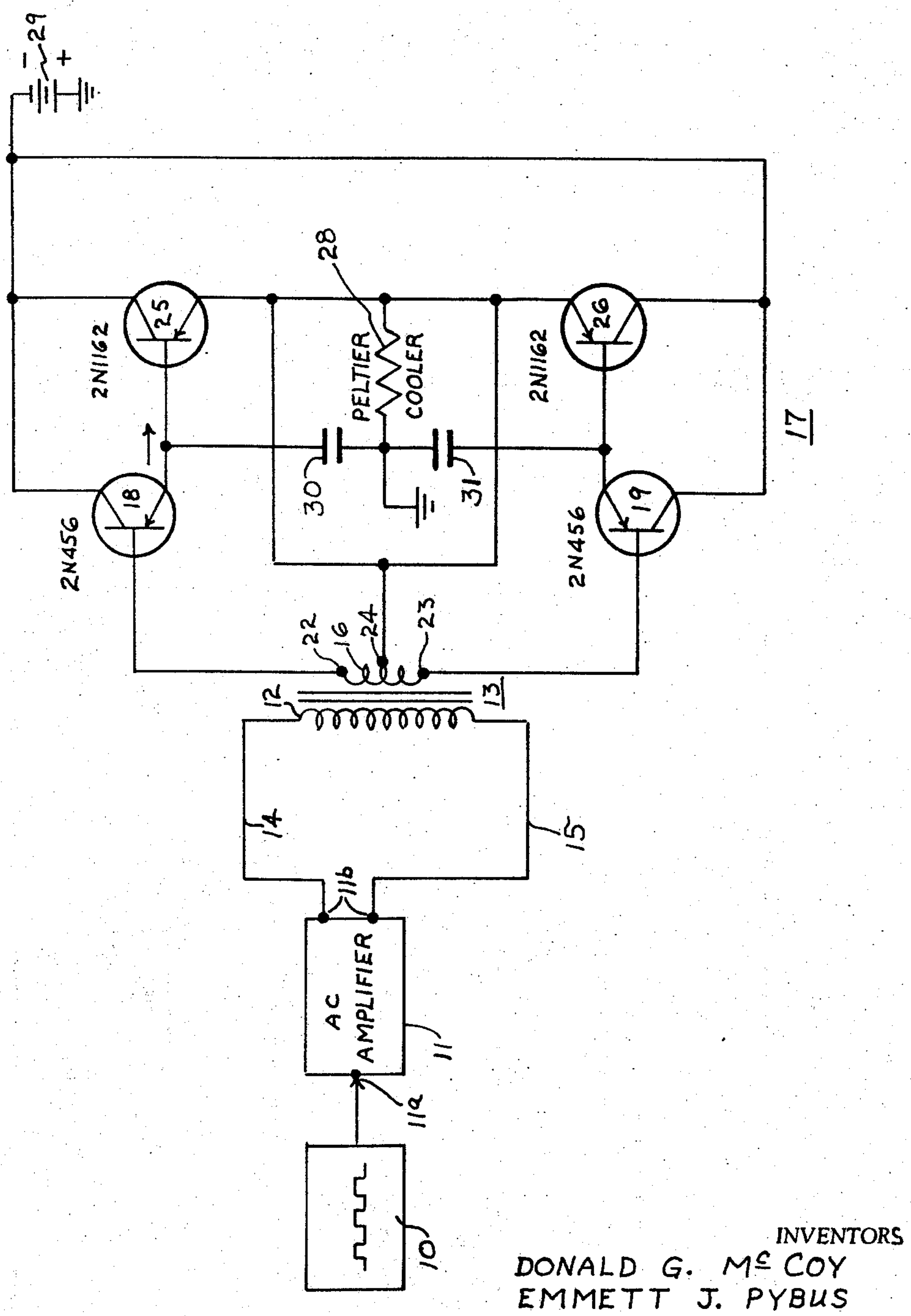
INVENTORS
DONALD G. McCOY
EMMETT J. PYBUS
BY Harry M. Saragovitz,
Edward J. Kelly &
A. J. Dupont ATTORNEYS United States Patent Office 3,344,337

Patented Sept. 26, 1967

3,344,337

A.C. CONTROLLED D.C. CURRENT AMPLIFIER

Donald G. McCoy, Baltimore, and Emmett J. Pybus, Havre de Grace, Md., assignors to the United States of America as represented by the Secretary of the Army Filed Sept. 27, 1965, Ser. No. 490,746
2 Claims. (Cl. 321—43)

The invention described herein may be manufactured and used by or for the Government for governmental purposes, without the payment to us of any royalty thereon.

This invention relates to converters and more particularly to an A.C. controlled, D.C. current amplifier.

An object of the invention is a stable A.C. controlled, D.C. current amplifier for use in a dew point hygrometer system in environments where the temperature ranges from +30° C. to −75° C.

Another object of the invention is an A.C. controlled, D.C. current transistor amplifier wherein the D.C. characteristics thereof are not susceptible to large ambient temperature changes.

The specific nature of the invention as well as other objects and advantages thereof will clearly appear from the following description and accompanying drawing in which the sole figure is a schematic diagram of the invention.

Referring now to the sole figure in the drawing, there is shown an embodiment of the invention in which numeral 10 indicates means for generating an alternating electric current or signal such as illustrated in the thermoelectric dew point systems disclosed in U.S. Patents Nos. 3,195,345 and 3,112,648 which include a Peltier cooler or refrigerator. The alternating current so generated is applied to the input 11*a* of A.C. amplifier 11. The output of amplifier 11 is connected by means of output terminals 11*b* and conductors 14 and 15 to the primary winding 12 of a stepdown, voltage to current, transformer 13. The secondary winding 16 is provided with end taps 22 and 23 and a center tap 24. The amplifier 17 of the converter consists of a push-pull transistor driver stage employing two 2N456 transistors 18 and 19 operated in the A.C. mode because in this mode transistors 18 and 19 are less susceptible to change of D.C. characteristics due to temperature change over a wide range than if operated in the D.C. mode entirely. The base electrodes of transistors 18 and 19 are connected to terminals 22 and 23, respectively, of the low voltage, high current secondary winding 16 of transformer 13.

The second stage of the transistor amplifier is a power stage consisting of two 2N1162 transistors 25 and 26 in a push-pull circuit arrangement. The base electrode of transistor 25 is connected to the emitter electrode of transistor 18 and the base electrode of transistor 26 is connected to the emitter electrode of transistor 19. The collector electrodes of the aforementioned transistors are connected to the negative pole of potential source 29. The emitter electrodes of transistors 25 and 26 are connected together and have a common connection to the center tap 24 of winding 16. A thermoelectric refrigerator 28, low impedance load, of the type having a junction which is cooled by the passage of electric current therethrough has one of its terminals connected to the emitter electrodes of transistors 25 and 26 and its other terminal connected to the positive pole of potential source 29. Unique in the push-pull driver stage is the filter at the output thereof, consisting of a capacitor 30 which has one terminal connected to the emitter electrode of transistor 18 and its other terminal connected to the positive pole of the potential source 29 and a capacitor 31 which is connected between the emitter of transistor 19 and the aforementioned positive pole. By this arrangement filtering is done at a higher impedance level than otherwise and requires but smaller filter components.

In one application, the A.C. to D.C. converter of the invention is used in a dew point hygrometer system, indicated by block 10, which may employ a solar cell detector producing an A.C. signal in response to the difference in intensity of two light beams. The A.C. signal thus generated is of small amplitude and is coupled to A.C. amplifier 11 which has a gain of about 1000. The output of amplifier 11 is coupled to a stepdown transformer thereby making available at the base electrodes of transistors 18 and 19, which act as rectifiers, a low voltage at a relatively high current. The magnitude of the current that is so applied to these base electrodes being controlled by the amplitude of the A.C. signal of the solar cell and hence is ultimately controlled by the amount of unbalance between the two light beam intensities at any time. The driver-rectifier stage of the amplifier consisting of transistors 18 and 19 have their emitter electrodes connected to the base electrodes of the power stage, consisting of transistors 25 and 26, whereby the power stage is driven. A capacitor connected between the emitter of transistor 18 and ground and another capacitor connected between the emitter electrode of transistor 19 and ground provide a filter at the output of the driver stage so that the current supplied to base electrodes of the power stage will have a low ripple. The Peltier cooler connected between the emitters of the power stage and ground is operated by the emitter current of the power stage, its rate of cooling varying in proportion to the rate of change of the emitter current.

What is claimed is:

1. An A.C. to D.C. converter for converting input A.C. signals of small amplitude to large D.C. signals comprising: an A.C. amplifier provided with input and output coupling means for amplifying input A.C. signals of small amplitude, a stepdown transformer having a high impedance winding and a low impedance winding, a first push-pull current-rectifier amplifier provided with input and output coupling means and operated in the A.C. mode, said high impedance winding connected to the output coupling means of said A.C. amplifier, said low impedance winding connected to the input coupling means of said first push-pull amplifier, a second push-pull amplifier for amplifying the direct current output of said first push-pull amplifier, input and output coupling means for said second push-pull amplifier, a low impedance current operated device connected in the output coupling means of said second push-pull amplifier, the input coupling means of said second push-pull amplifier connected to the output coupling means of said first push-pull amplifier, a common ground, and an interstage filter consisting of capacitor means connected between the output coupling means of said first push-pull amplifier and said common ground whereby the rectified current output of said first push-pull amplifier is filtered so that the ripple component thereof is reduced before being applied to the input of said second push-pull amplifier.

2. An A.C. to D.C. converter for converting input A.C. signals of small amplitude to large D.C. signals comprising: an A.C. amplifier provided with input and output coupling means for amplifying input A.C. signals of small amplitude, a stepdown transformer having a high impedance winding connected to the output coupling means of said A.C. amplifier and a low impedance winding provided with end taps and a center tap, a push-pull amplifier operated in the A.C. mode consisting of a first and second transistor each having base, emitter and collector electrodes, the base electrode of said first transistor connected to one of said end taps, the base electrode of said second transistor connected to another of said end taps, a second push-pull amplifier consisting of a third and fourth transistor each having base, emitter and collector electrodes, the emitter electrode of said first transistor connected to the base electrode of the third transistor, the emitter electrode of the second transistor connected to the base electrode of the fourth transistor, the emitter electrodes of the third and fourth transistors connected to said center tap, a common ground, a potential source having one pole thereof connected to said common ground and another pole thereof connected to the collectors of said first, second, third and fourth transistors, a low impedance current operated device connected between the emitters of said third and fourth transistors and said common ground, and an interstage filter consisting of a first capacitor coupling the emitter of said first transistor to said common ground and a second capacitor coupling the emitter of said second transistor to said common ground whereby the rectified current output of said first push-pull amplifier applied to base electrodes of said second push-pull amplifier is filtered so that the ripple component thereof is reduced.

References Cited

UNITED STATES PATENTS

| | | | |
|---|---|---|---|
| 2,883,479 | 4/1959 | Aronson | 330—19 XR |
| 3,032,719 | 5/1962 | Beck | 330—15 XR |
| 3,166,928 | 1/1965 | Jackson et al. | 73—336.5 XR |
| 3,256,491 | 6/1966 | Dewey et al. | 330—15 XR |
| 3,312,833 | 4/1967 | Durrett | 307—88.5 |

JOHN F. COUCH, *Primary Examiner.*

WILLIAM SHOOP, *Assistant Examiner.*